Figure 1:
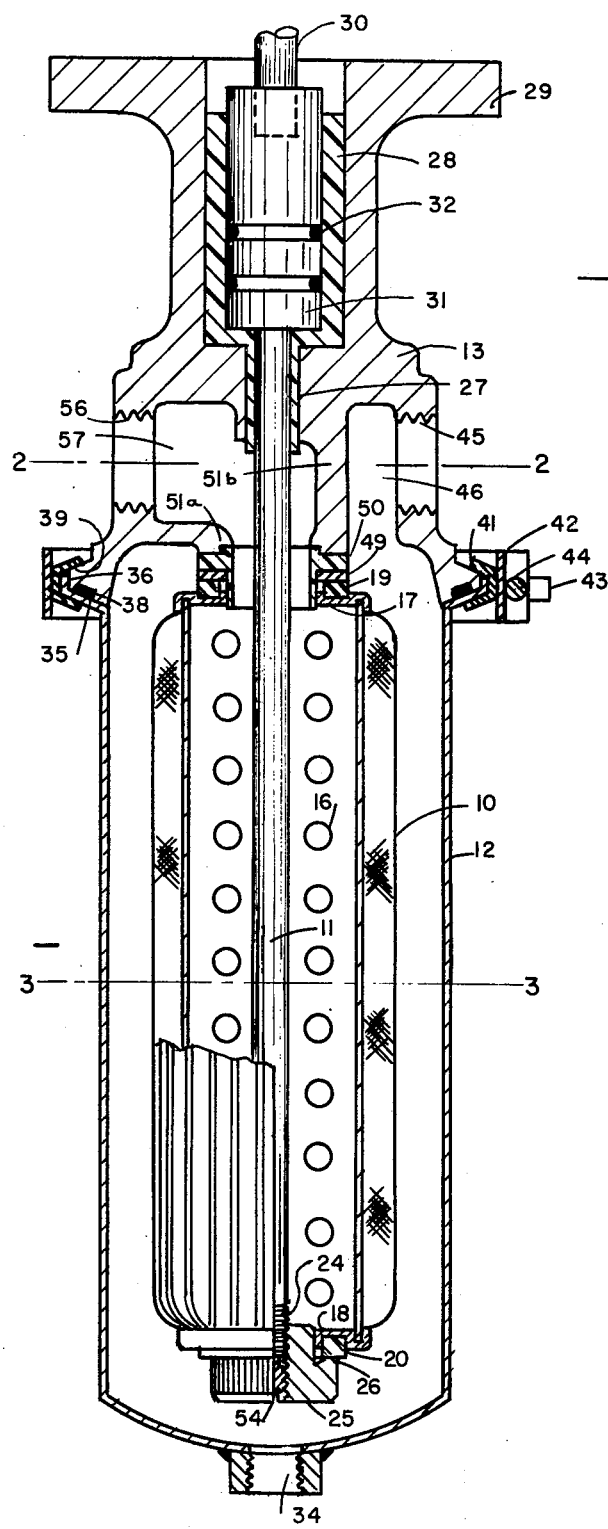

United States Patent [19]

Cusato, Jr.

[11] 4,204,961

[45] May 27, 1980

[54] FILTER APPARATUS WITH CLEANING FUNCTION

[76] Inventor: John Cusato, Jr., 1902 Surrey Rd., Oreland, Pa. 19075

[21] Appl. No.: 7,965

[22] Filed: Jan. 31, 1979

Related U.S. Application Data

[63] Continuation-in-part of Ser. No. 886,680, Mar. 15, 1978, abandoned.

[51] Int. Cl.² ............................................. B01D 35/16
[52] U.S. Cl. .................................... 210/232; 210/251; 210/370; 210/391; 210/407
[58] Field of Search ................. 210/107, 79, 369, 370, 210/374, 380 R, 391, 407, 435, 440, 443, 444, 232, 251; 55/290, 304; 308/241, 8.2, DIG. 8

[56] References Cited

U.S. PATENT DOCUMENTS

| | | | |
|---|---|---|---|
| 1,926,557 | 9/1933 | Perkins | 210/443 |
| 3,750,885 | 8/1973 | Fournier | 210/107 |
| 3,793,195 | 2/1974 | Betts | 308/241 |

*Primary Examiner*—Frank Sever

[57] ABSTRACT

A fluid filter apparatus has a standard filter element in it and its usual end gaskets are utilized to rotate the filter by a rotating shaft and to provide a frictionless bearing against the housing interior.

7 Claims, 4 Drawing Figures

FILTER APPARATUS WITH CLEANING FUNCTION

This is a continuation in part application of my parent application Ser. No. 886,680 filed on Mar. 15, 1978 having this same title now abandoned.

This invention relates to fluid filters and particularly to filter apparatus which provides for the rotation of a cylindrical filter element about its axis to centrifugally throw off the debris which has been filtered out of the fluid and has collected on the outside of the filter element.

Fluid filters of this general type are known and representative ones are shown in U.S. Pat. No. 3,750,885 to P. W. Fournier and patent 3,647,071 to P. Lamort. However, as is evident from these patents the prior apparatus has required that the filter element be of special construction. Moreover, in most instances the housing or shell has had to be of special construction to accommodate the unusual conformation of the filter element. These prior filter apparatus have consequently been expensive to initially construct and the replacement of the filter element has required the purchase of the same unique or particular construction.

An important feature of the present invention is the use of a conventional filter element. As it is one which can readily be purchased in the open market, a minimal modification of the structure of the enclosing housing is all that is necessary. The most important aspect is that an inexpensive standard filter element is to be used and its replacement involves merely the repurchase of the conventional filter element. When a new element is to be installed, neither skilled help nor special instructions are necessary.

The consequent reduced initial cost of the fluid filter and the low cost of replacement filters make the apparatus especially appealing. Also, the short shut-down time to replace the filter element is a sales attractive feature.

Figure 2:
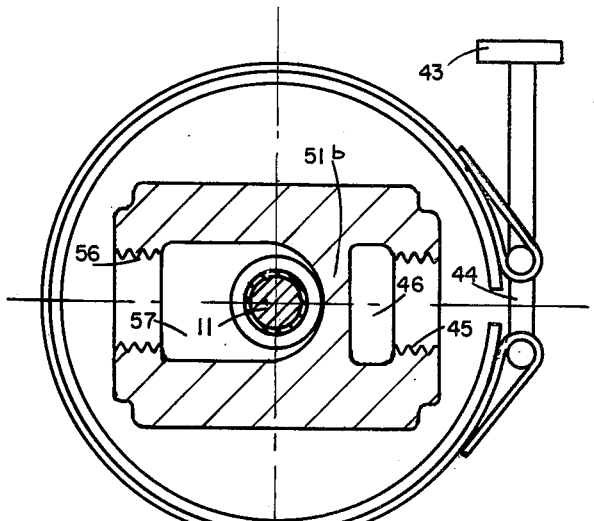
Figure 3:
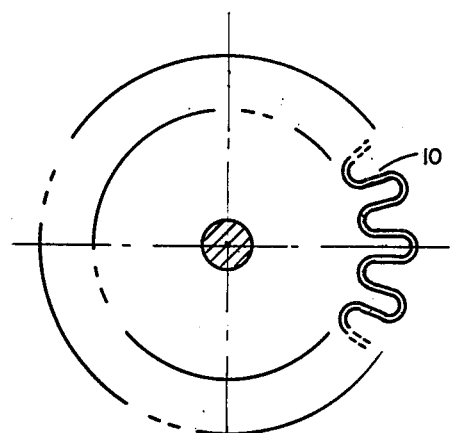
Figure 4:
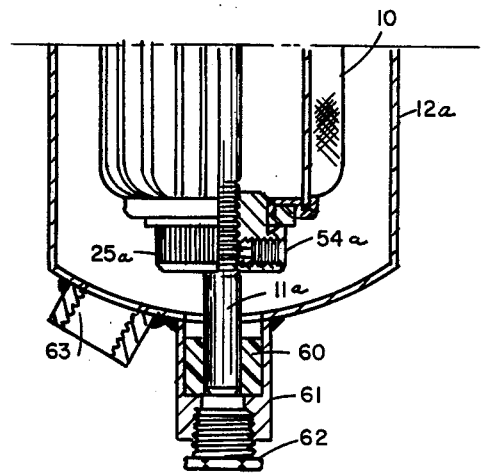

In the accompanying drawings:

FIG. 1 is a longitudinal, sectional view through the axis of a preferred embodiment of the invention, a portion at the center being indicated as removed and the lower portion of the filter element being in elevation to show the exterior flutes, FIG. 2 is a section on the line 2—2 of FIG. 1, FIG. 3 is a section on the line 3—3 of FIG. 1 of the filter element and FIG. 4 is an elevational view similar to the bottom of FIG. 1, showing a modification which includes a lower shaft bearing.

Generally considered, the filter apparatus is made up of the filter element 10 of elongated cylindrical shape, the vertical shaft 11 which is rotatably mounted and is located at the axis of the filter element and serves to drive it, the shell 12 of the outer housing or casing and the head 13 of the housing, which also provides the bearing for the shaft. These and the associated parts will separately be described.

The filter element 10 is a standard one and as is stated above this is a feature of the invention because commercially available elements can be expected to be considerably less expensive than especially constructed ones. The filter element of the drawings is representative, for example, of the stainless steel felt or mesh material employed in the filters marketed by Tecmefilter Corporation of Chatsworth, California, or by Pall Corppration of Glen Cove, N.Y. The felt or mesh material is composed of randomly arranged micronic stainless steel fibers which have been compressed and securely sintered into porous sheets.

The sheets of this porous material are generally fluted as shown here in order to provide more surface area per volume of space than it occupies but a fluted-surface filter element is not essential for the invention. The filter material is curved into a cylindrical shape so that the element 10 has a hollow interior. If the material is fluted, the flutes are disposed lengthwise of the cylindrical element.

In one make of filter element the filter sheet 15 is wrapped around a central tube 16 which has a plurality of holes through it for the free passage of fluid. To one end of the tube 16 (the top end here) is attached an annular disc 17 and to the other end of the tube 16 (the bottom end here) is attached an annular disc 18. This attachment may either be by welding or by a firm press fit of the ends of the tube 16 into grooves in the discs 17 and 18.

The outer faces of the discs 17 and 18 are annularly recessed or cupped to receive and retain a ring gasket 19 and 20 respectively. These ring gaskets 19 and 20 are made of rubber or rubber-like synthetic material which is somewhat yieldable and provides a frictional surface. In the ordinary, conventional installation these gaskets 19 and 20 press against a fixed surface of the housing or other structure to form a fluid tight seal.

In accordance with the invention the friction surface of the lower gasket 20 is utilized to frictionally drive and rotate the filter elemtnt 10 and the friction surface of the upper gasket 19 is utilized to fricionally carry with it an antifriction element or disc as will be explained. Thus, a conventional filter element is adapted to a rotatable operation with no change in its structure.

The shaft 11 is located at the axis of the cylindrical filter 10 and passes throughout its length. The lower end is threaded at 24 and a nut 25 is screwed on it and fixed in place by the set screw 54 or like means. An annular rib 26 is formed on the face of the nut 25 by circumferentially reducing the face end of the nut. This annular rib 26 bears against the sealing gasket 20 to prevent leakage of fluid at this area and also to frictionally drive and rotate the filter element 10 when the shaft 11 is rotated.

The shaft 11 passes upwardly through the housing head 13 and is rotatable in the sleeve bearing 27 which is firmly pressed into a bored hole through the top of the head 13. To provide additional bearing surface the bearing 27 material includes an integral hublike enlargement 28 which closely fits in the top of the head 13. The shaft 11 is enlarged within this enlargement 28 of the bearing 27 so that a bearing fit is established. As the bearing 27-28 has a press fit in the head 13 it is replaceable and it preferably is made of bearing bronze since the shaft would be of steel.

The head 13 has a flange 29 for the attachment of a motor (not shown) having a shaft 30. The shaft enlargement 31 bears downwardly against the shoulder within the bearing 27-28 to form a thrust bearing. Conventional O-rings 32 provide a liquid seal. The shaft 30 can be rotated by a pulley-belt drive.

The housing shell 12 is an elongated cylinder having a threaded port opening 34 at its bottom for the escape of the filter cake particles. It may be closed with a removable plug or a valve may permanently be screwed into 34. The top end of the shell 12 is flared and flanged outwardly into a cupped shape to include the upwardly and outwardly sloping portion 35 and the terminal cylindrical portion 36. This purpose will be explained.

The bottom end of the housing head 13 is formed with an exterior cylindrical surface which snugly fits down into the cylindrical portion 36 of shell 12. This centers the shell 12 underneath the head 13 and places them in alignment. The lower end of the head 13 has a sloping face which fits against the sloping portion 35 at the top of shell 12 and a sealing gasket 38 is located in the annular groove at the end face of the head.

Upwardly from the cylindrical surface 37 of the head 13 is a surface 39 which slopes outwardly and downwardly with the result that this sloping surface 39 and the sloping surface at 35 of the shell 12 both taper toward each other to form a wedge shape in cross section. Corresponding internally tapered surfaces are on the clamping ring 41 so that as it is collapsed around the junction of the shell 12 and the head 13 they will be drawn together in sealing engagement with the gasket 38. The clamping ring 41 is forced inwardly by the gripping ring 42 which is of standard construction and need not be described. It is closed inwardly by manipulation of the screw 44 and its handle 43.

The head has a threaded inlet port 45 which communicates with an internal inlet chamber 46 which opens downwardly into the space between the shell 12 and the outside of the filter element 10. A washer 49 of stainless steel or other suitable material as will be explained, is interposed between the gasket 19 and a bearing bushing 50 of bronze or other suitable material as will also be explained. This bushing 50 has a pressed fit in a socket at the extreme underside of the head and forms a replaceable part of the head 13.

The washer 49 is in frictional engagement with the gasket 19 due principally to the frictional surface of the gasket 19 with the result that the washer is driven by and turns with the gasket 19 and the filter element 10. This means that the washer 49 turns against the bushing 50 and that their surfaces in contact with each other provide the bearing area. It is preferred that the washer 49 be of steel and the bushing be of bearing bronze but the materials may be reversed. The important concern is that the two materials be non-galling relative to each other and from this it is evident that one of them may be of plastic material such as Teflon.

The nut 25 should be screwed on the threads 24 within the range which will cause the shaft to drive the filter element 10 through the frictional effects of the gasket 20 but which will not prevent the necessary relatively non-fricional slippage between washer 49 and bushing 50. This setting is fixed by the set screw 54.

The outlet port is threaded at 56 and it communicates with an outlet chamber 57 which is separated from the inlet chamber 46 by the internal partition 51a–51b. A hole through this partition has the bushing 50 in it so that the outlet chamber 57 communicates only with the hollow interior of the filter element 10. Because of this all the dirty fluid entering port 45 must pass through the filter sheet of element 10 and all of the cleaned fluid can escape only out of the threaded port 56.

It should be observed that the inlet 45 and outlet 56 are axially in line with each other and that this makes it easy to break into a straight fluid line and insert this filter apparatus. This arrangement also makes it easy to remove the shell 12 for inspection or replacement of the filter element.

As the installation and operation of this general type of self cleaning filter apparatus is well known in the art a detailed discussion is unnecessary. This is made additionally clear by the above mentioned patents as well as U.S. Pat. No. 1,926,557 to C. B. Perkins.

The combined length of the bearing surfaces within the bushing 27–28 will normally prevent wobbling of the shaft 11 and the filter element. However, if two or more filter elements are to be placed end to end on the shaft or if an exceptionally long single filter is to be used, the lower shaft bearing of FIG. 4 may be provided.

In this construction the shaft 11a is long enough to extend into a bearing bushing 60 which fits in and is held by the tubular extension 61 affixed around the hole at the bottom of the shell 12. This bushing axially receives the lower end of the shaft and prevents it from wobbling. The lower end of the tubular extension 61 is closed by the plug 62. Dirt is removed through the normally plugged opening at 63.

The securing nut 25a has a set screw 54a in its side to retain the nut in place. The assembly of the structure of FIG. 4 is easily achieved and the above mentioned alignment of the shell 12 to the head at 27 facilitates this.

Variations of the structure are evident. The washer 49 may be thicker or thinner to serve as the annular bearing element between the internal partition and the gasket 19 at the communicating end opening of the filter element. The washer 49 will generally be of a hard metal such as iron or steel and the contact surface on the head 13, such as bearing 50, will generally be of a relatively soft metal such as bronze to be non-galling. As stated above, these materials may be reversed or one of them may be a suitable plastic.

A nut 25 serves as a driving element and it could be a conventional collar which is held on the shaft by a set screw like 54a. Also, as here shown, the bearing 50 has a depending sleeve portion which extends down through the washer 49 and into the top of the filter element to keep it cenetered especially during rotation but other centering means on the shaft are evident.

I claim:
1. A fluid filter apparatus which comprises:
   a housing forming an enclosed space and having an inlet opening and an outlet opening,
   a filter element in said enclosed space of hollow cylindrical form with an opening at its opposite ends,
   a gasket presenting a friction surface around the openings at both ends of the filter element,
   a shaft rotatably mounted in the housing and passing therethrough and located at the axis of the filter,
   connecting means between the shaft and the filter element to rotate the filter and spin off dirt collected thereon,
   and a partition within the housing separating the inlet and outlet openings and directing fluid from the inlet opening to the exterior of the filter element, said partition having an opening therethrough which communicates with an end opening of the filter element so fluid from the hollow interior flows to the outlet opening,
   and includes the improvement comprising:
   an annular bearing element of a material of construction which is non-galling relative to the material of construction of the partition disposed between the partition at its opening and the gasket at the communicating end opening of the filter element,
   said material of construction of said bearing element also being frictionally drivable by the material of construction of said gasket when the shaft is ro- tated and frictionlessly bearing on the partition to form a relatively free slippage area between them.

2. The fluid filter of claim 1 in which said bearing element is a washer of hard metal and the contact surface of the partition is of a relatively soft material which is non-galling.

3. The fluid filter of claim 1 in which the bearing element is an iron washer and the contact surface of the partition is of bearing bronze.

4. The fluid filter of claim 1 in which said partition has a sleeve bearing portion at said opening which extends through the bearing element and into the filter element to center the filter during rotation.

5. the fluid filter of claim 1 in which said shaft has an enlargement which provides an end-thrust bearing surface.

6. The fluid filter of claim 1 in which said connecting means to rotate the filter element includes a driving element which is fastened to the shaft and frictionally bears on the filter gasket which is remote from the partition.

7. The fluid filter of claim 1 in which said connecting means to rotate the filter element includes a nut which is adjustably threaded on the shaft and frictionally bears on the filter gasket which is remote from the partition.

* * * * *